(12) United States Patent
Dai Zovi (10) Patent No.: US 10,673,622 B2
(45) Date of Patent: Jun. 2, 2020

(54) CRYPTOGRAPHIC SHADER IN DISPLAY HARDWARE

(71) Applicant: Square, Inc., San Francisco, CA (US)

(72) Inventor: Dino Dai Zovi, Brooklyn, NY (US)

(73) Assignee: SQUARE, INC., San Francisco, CA (US)

( * ) Notice: Subject to any disclaimer, the term of this patent is extended or adjusted under 35 U.S.C. 154(b) by 1004 days.

(21) Appl. No.: 14/542,481

(22) Filed: Nov. 14, 2014

(65) Prior Publication Data
US 2016/0142202 A1    May 19, 2016

(51) Int. Cl.
*H04L 9/08* (2006.01)
*G06T 1/20* (2006.01)

(52) U.S. Cl.
CPC .............. *H04L 9/0819* (2013.01); *G06T 1/20* (2013.01); *H04L 2209/24* (2013.01)

(58) Field of Classification Search
CPC ...... G06F 21/10; G06F 21/60; G06F 21/6209; G06F 21/6281; H04L 45/00; H04L 49/3009
See application file for complete search history.

(56) References Cited

U.S. PATENT DOCUMENTS

| | | |
|---|---|---|
| 5,832,206 A | 11/1998 | De Jesus et al. |
| 6,313,838 B1 | 11/2001 | Deering |
| 6,373,499 B1 | 4/2002 | Acker |
| 6,543,684 B1 | 4/2003 | White et al. |
| 6,669,100 B1 | 12/2003 | Rogers et al. |
| 6,771,877 B1 | 8/2004 | Ono et al. |

(Continued)

FOREIGN PATENT DOCUMENTS

| | | |
|---|---|---|
| WO | 2016/069782 A1 | 5/2016 |
| WO | 2016/122749 A1 | 8/2016 |

OTHER PUBLICATIONS

Yang, J., et al., "Symmetric Key Cryptography on Modern Graphics Hardware," Advances in Cryptology, ASIACRYPT 2007, LNCS vol. 4833, pp. 249-264.

(Continued)

*Primary Examiner* — Joseph P Hirl
*Assistant Examiner* — Sayed Aresh Beheshti Shirazi
(74) *Attorney, Agent, or Firm* — Mattingly & Malur, PC (57) ABSTRACT

A technique is introduced that can securely displaying decrypted images while preventing these decrypted images against an attempt to capture such. Some aspects of the technique include loading a cryptographic shader into a graphics processor unit (GPU) in the recipient's computer device separate from the CPU in the recipient's computer device. In some embodiments, the cryptographic shader that is loaded includes instructions that implement a white-box cryptographic algorithm to decrypt encrypted images. A cryptographic key is integrated within the white-box cryptographic algorithm so that the cryptographic key is protected from extraction. When the GPU receives the encrypted images, the cryptographic shader can perform decryption processes to generate decrypted images. The decrypted images are loaded by the GPU directly from the GPU into a frame buffer such that the decrypted images are to be displayed without any portion of the decrypted images passing through the CPU.

20 Claims, 8 Drawing Sheets

(56) References Cited

U.S. PATENT DOCUMENTS

| | | | |
|---|---|---|---|
| 7,484,173 B2 | 1/2009 | Gao et al. | |
| 8,850,216 B1* | 9/2014 | Mikhailov | G06F 21/10 |
| | | | 713/182 |
| 9,346,282 B2 | 5/2016 | Page et al. | |
| 9,430,635 B2 | 8/2016 | Dai Zovi | |
| 9,489,354 B1 | 11/2016 | Lee et al. | |
| 2003/0182558 A1 | 9/2003 | Lazzaro et al. | |
| 2003/0235452 A1 | 12/2003 | Kraus et al. | |
| 2004/0057600 A1 | 3/2004 | Niwa | |
| 2004/0151385 A1 | 8/2004 | Oneda et al. | |
| 2004/0257238 A1 | 12/2004 | De Jongh | |
| 2005/0074117 A1* | 4/2005 | Tanaka | H04L 9/0625 |
| | | | 380/42 |
| 2005/0114395 A1 | 5/2005 | Muralidharan | |
| 2005/0213766 A1* | 9/2005 | Goss | G06F 21/72 |
| | | | 380/277 |
| 2006/0224523 A1 | 10/2006 | Elvitigala | |
| 2006/0242421 A1 | 10/2006 | Hsu | |
| 2007/0016792 A1 | 1/2007 | Allen, Jr. et al. | |
| 2007/0154018 A1* | 7/2007 | Watanabe | H04L 63/0428 |
| | | | 380/273 |
| 2007/0183000 A1 | 8/2007 | Eisen et al. | |
| 2008/0008314 A1 | 1/2008 | Dempski et al. | |
| 2008/0060052 A1 | 3/2008 | Hwang et al. | |
| 2008/0110981 A1 | 5/2008 | DeLine et al. | |
| 2008/0148186 A1 | 6/2008 | Krishnamurthy | |
| 2008/0168546 A1 | 7/2008 | Almeida | |
| 2008/0192047 A1 | 8/2008 | Radzikowski et al. | |
| 2008/0258940 A1 | 10/2008 | Ding et al. | |
| 2008/0283590 A1 | 11/2008 | Oder, II et al. | |
| 2008/0301767 A1 | 12/2008 | Picard et al. | |
| 2009/0044282 A1 | 2/2009 | Govindaraju | |
| 2009/0060334 A1 | 3/2009 | Rayner | |
| 2009/0254994 A1 | 10/2009 | Waterson | |
| 2010/0109920 A1 | 5/2010 | Spradling | |
| 2010/0134328 A1 | 6/2010 | Gutowitz et al. | |
| 2010/0180120 A1 | 7/2010 | Frenkel et al. | |
| 2010/0259560 A1 | 10/2010 | Jakobson et al. | |
| 2010/0262835 A1 | 10/2010 | Joffray | |
| 2010/0268393 A1 | 10/2010 | Fischle et al. | |
| 2011/0064383 A1 | 3/2011 | Bauchot et al. | |
| 2011/0185319 A1 | 7/2011 | Carapelli | |
| 2011/0225406 A1* | 9/2011 | Nelson | G06F 11/00 |
| | | | 713/2 |
| 2012/0042364 A1 | 2/2012 | Hebert | |
| 2012/0104090 A1 | 5/2012 | Gross | |
| 2012/0249408 A1 | 10/2012 | Moliton | |
| 2012/0268393 A1 | 10/2012 | Lee | |
| 2012/0299831 A1 | 11/2012 | Lioy | |
| 2012/0323788 A1 | 12/2012 | Keresman, III et al. | |
| 2013/0033523 A1 | 2/2013 | Stovicek et al. | |
| 2013/0050091 A1 | 2/2013 | Ge et al. | |
| 2013/0067228 A1* | 3/2013 | Dewan | H04L 9/0825 |
| | | | 713/171 |
| 2013/0091583 A1 | 4/2013 | Karroumi et al. | |
| 2013/0100182 A1 | 4/2013 | Yeh et al. | |
| 2013/0127857 A1 | 5/2013 | Carr et al. | |
| 2013/0145475 A1 | 6/2013 | Ryu et al. | |
| 2013/0159196 A1 | 6/2013 | DiZoglio | |
| 2013/0162679 A1 | 6/2013 | Kim et al. | |
| 2013/0194301 A1 | 8/2013 | Robbins et al. | |
| 2013/0207902 A1 | 8/2013 | Showering | |
| 2013/0276019 A1* | 10/2013 | Liu | G06F 21/30 |
| | | | 725/31 |
| 2014/0028566 A1 | 1/2014 | Gupta | |
| 2014/0040633 A1 | 2/2014 | Leleu | |
| 2014/0095387 A1 | 4/2014 | Colnot | |
| 2014/0096201 A1 | 4/2014 | Gupta | |
| 2014/0129445 A1 | 5/2014 | Yang | |
| 2014/0188734 A1 | 7/2014 | Neuwirth | |
| 2014/0201831 A1 | 7/2014 | Yi et al. | |
| 2014/0229744 A1* | 8/2014 | Doumen | G06F 21/121 |
| | | | 713/190 |
| 2014/0282204 A1 | 9/2014 | Park et al. | |
| 2014/0351739 A1 | 11/2014 | Leger | |
| 2015/0137944 A1 | 5/2015 | Fuerth | |
| 2015/0154414 A1 | 6/2015 | Pike | |
| 2015/0186857 A1 | 7/2015 | Swinfen | |
| 2015/0243258 A1 | 8/2015 | Howe | |
| 2015/0253925 A1 | 9/2015 | Nakao et al. | |
| 2015/0261968 A1 | 9/2015 | Polyachenko | |
| 2015/0371213 A1 | 12/2015 | Pike | |
| 2016/0050069 A1* | 2/2016 | Griffin | G06F 21/602 |
| | | | 713/189 |
| 2016/0125193 A1 | 5/2016 | Dai Zovi | |
| 2016/0307003 A1 | 10/2016 | Dai Zovi | |
| 2016/0371498 A1 | 12/2016 | Dai Zovi | |

OTHER PUBLICATIONS

Non-Final Office Action dated Feb. 1, 2016, for U.S. Appl. No. 14/527,639, of Zovi, D.D., filed Oct. 29, 2014.
Notice of Allowance dated Apr. 27, 2016, for U.S. Appl. No. 14/527,639, of Zovi, D.D., filed Oct. 29, 2014.
Non-Final Office Action dated May 6, 2016, for U.S. Appl. No. 14/527,629, of Zovi, D.D., filed Oct. 29, 2014.
Notice of Allowance dated Jul. 11, 2016, for U.S. Appl. No. 14/527,629, of Zovi, D.D., filed Oct. 29, 2014.
International Search Report and Written Opinion for International Application No. PCT/US2015/057876, dated Mar. 31, 2016.
International Search Report and written opinion for International Application No. PCT/US2015/060713, dated Jul. 26, 2016.
Non Final Office Action dated Mar. 31, 2017, for U.S. Appl. No. 15/196,003, of Zovi, D.D., filed Jun. 28, 2016.
Non Final Office Action dated Feb. 10, 2017, for U.S. Appl. No. 15/252,113, of Zovi, D.D., filed Aug. 30, 2016.

* cited by examiner

CRYPTOGRAPHIC SHADER IN DISPLAY HARDWARE

FIELD OF THE INVENTION

This invention relates generally to computer security, and more particularly, to protecting information displayed on an end user device against attempts to capture such information.

BACKGROUND

With the prevalence of computers and portable electronic devices, the preferred mode of information presentation has long since shifted from paper to electronic. Typically, such an electronic device is equipped with a display screen (e.g., a liquid-crystal display (LCD) screen) that presents visual information to a human user. In many instances, for example, when financial or commercial transactions are involved, sensitive information such as a social security number or bank account number may be stored in the device at least temporarily in the form of image data representing an image to be displayed on the display screen. Additionally, many websites use image-based identification verification mechanisms, such as a "security image" feature that shows to users an image of their own selection in order to for the users to verify the authenticity of the website (i.e., assuming that a fake website does not have access to such information). This state of technology has created a vulnerability to an unscrupulous entity installing a malicious software application in an end user device (e.g., on the user's computer, such as a "Trojan horse" or other malware, i.e., software designed to overcome data security measures without authorization) to capture such images when these images are stored in the device.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

References in this description to "an embodiment," "one embodiment," or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

As mentioned above, sensitive information such as a social security number or bank account number may be stored in the form of image data representing an image to be displayed on the display screen. Additionally, many websites use image-based identification verification mechanisms, such as a "security image" feature that shows to users an image of their own selection in order to for the users to verify the authenticity of the website (i.e., assuming that a fake website does not have access to such information). These images embodying sensitive information are potentially subject to capture when they are stored in memory in a user device, such as a personal computer, tablet or smartphone. One way to mitigate this problem is to encrypt these images so that they become unrecognizable even if they are intercepted, for example, by a malicious person's computer system that sits between a server and a recipient's computer. Theoretically, only the recipient's computer has the knowledge of how to decrypt the encrypted images. However, when a malicious software application (or a "malware") is installed on the recipient's computer itself, the malware may be able to gain access to data communicated within the operating system, for example, between the central processing unit (CPU) and the memories (e.g., a main memory or a hard disk drive). Therefore, even with the images encrypted, the images still can potentially be captured by malware after the images are decrypted by the recipient's computer if the recipient's computer is compromised.

Introduced here, therefore, is a technique that can allow an end-user device to securely display decrypted images that contain sensitive information while protecting the decrypted images against an unauthorized attempt to capture them.

Note that the technique introduced here shall be distinguished from the conventional notion of offloading cryptographic calculations from a CPU to a GPU. Specifically, with the ever increasing computing power of modern GPUs, it is possible to use the GPU to assist the CPU in performing complex cryptographic calculations, such as relying on the GPU to perform an AES encryption or decryption calculation and have the GPU return the calculated data to the CPU, in order to reduce the CPU resource and time consumed for such calculation. Notwithstanding the performance gain, when a malicious software application (or a "malware") is installed on the recipient's computer itself, the malware may still be able to gain access to data communicated within the operating system, for example, by eavesdropping between the CPU and the memories (e.g., a main memory or a hard disk drive), by copying the data stored in the memories, or by mimicking a legitimate software application's communication; therefore, the decrypted images are still subject to capture by malware in those scenarios.

As is discussed in more detail below, some aspects of the technique introduced here include loading a cryptographic shader into a graphics processor unit (GPU) in the recipient's computer device separate from the CPU in the recipient's computer device. For purposes of discussion here, a cryptographic shader is a program that can be loaded into a GPU (e.g., in a programmable shader processor) for cryptographically processing images, and more specifically, a program that implements a cryptographic algorithm for decrypting/encrypting images. As used herein, the term "shader" can generally refer to, as will be apparent from the context, (i) a shader program, (ii) a shader processor hardware, or (iii) a combination of a shader program loaded in a programmable shader processor hardware, that is used to perform "shading"—the production of appropriate levels of color within an image, or, in some instances, to also produce special effects or do image/video post-processing.

In some embodiments, the cryptographic shader includes instructions that implement a white-box cryptographic algorithm to decrypt encrypted images. A cryptographic key is integrated within the white-box cryptographic algorithm so that the cryptographic key is protected from extraction. For purposes of discussion herein, the term "white-box cryptography" refers to a secure implementation of cryptographic algorithm (e.g., the Advanced Encryption Standard (AES)) in an execution environment that is fully observable and modifiable by anyone, including an attacker, such as in a desktop computer or a mobile device. White-box cryptography allows one to perform cryptographic operations without revealing any portion of confidential information such as the cryptographic key. Commonly seen examples of such environments are digital rights management clients, game consoles, mobile phones, and set-top boxes.

In some implementations, after encrypted images are received by a user device from a remote server via a network, the encrypted images are first stored in the user's device (e.g., in main memory or a receiving buffer of a communication circuit). Then, the encrypted images are transferred (e.g., copied or moved) from the memory to the GPU while the images stay encrypted. When the GPU receives the encrypted images, the cryptographic shader performs decryption processes to generate decrypted images. After the encrypted images are decrypted by the cryptographic shader in the GPU, the decrypted images are loaded by the GPU directly into a frame buffer such that the decrypted images are displayed by a display device of the recipient's user device, without any portion of the decrypted images having passed through the CPU or the main memory. As explained further below, because the GPU architecture is structured as a subsystem having its own memories and generally separate from the CPU and main memory, the decrypted images thus are effectively shielded from attempts to capture them by any malware residing on the recipient's computer.

As discussed in greater detail below, in addition to generating a plurality of images, other aspects of the technique include the recipient's computer receiving the cryptographic shader from the remote server via a secured network communications protocol. Additionally or alternatively, the server can instruct the recipient's computer to change the cryptographic shader so that the encrypted images can be correctly decrypted. For example, the server can send out a signal indicating that there is or will be a change in the white-box cryptographic algorithm and the cryptographic key combination (i.e., either a different cryptographic algorithm is used, or a different cryptographic key is used, or both). The recipient's computer can, for example, calculate a hash value based on a hash function using the received signal. The hash value may represent, for example, which cryptographic shader, out of a plurality of available cryptographic shaders stored in the main memory, is to be loaded into the GPU in order to correctly decrypt the encrypted image.

In the following description, the example of a point-of-sale (POS) system in a restaurant is used, for illustrative purposes only, to explain various aspects of the technique. Note, however, that the technique introduced here is not limited in applicability to restaurants or to any other particular kind of business. Also, although the following description focuses on implementing various aspects of the disclosed technique on a point-of-sale system, other electronic devices or systems (e.g., a customer's mobile computing device) may adapt the technique in similar manner. Additionally, the term "sale," as in point-of-sale (POS), refers to any type of payment-oriented transaction, including providing of a service, a lease or rental for example, and is not limited to an actual purchase. Note also that in this description, in the context of a sale, the term "user" generally refers to a customer (as opposed to a merchant), except where otherwise indicated, and except that the term "user interface" does not necessarily refer to an interface used by a customer, as will be apparent from the context.

Figure 1:
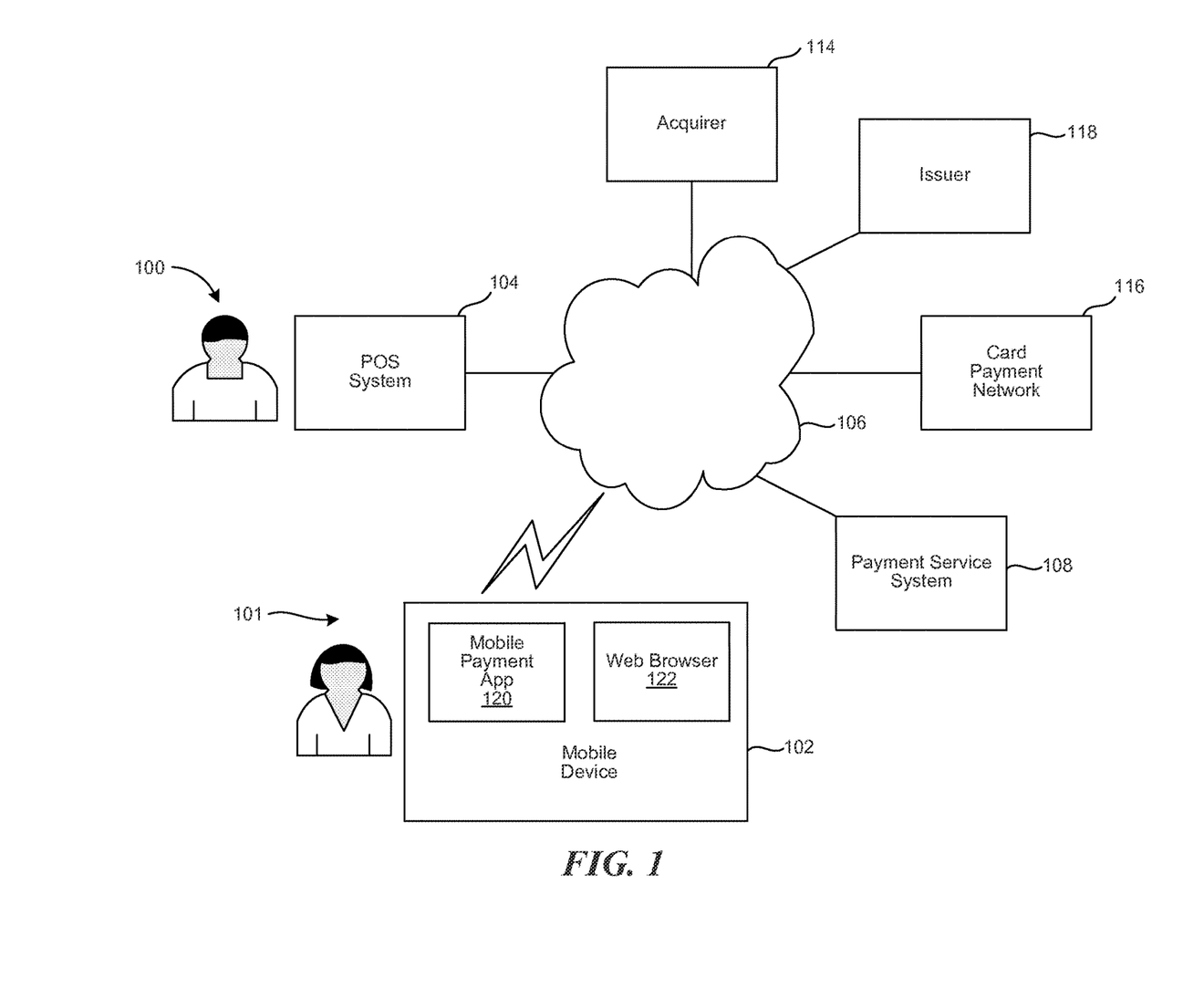
FIG. 1 illustrates an environment within which the cryptographic shader techniques introduced here can be implemented.

FIG. 1 illustrates an environment within which the cryptographic shader techniques introduced here can be implemented (e.g., in conjunction with a credit card transaction where sensitive information such as card number, expiration date, cardholder's name, and the card verification value (CVV) code may be displayed using encrypted images). The environment includes a merchant POS system 104 of a merchant 100. Optionally, the environment can further include a mobile device 102 of a user 101 (also referred to as a "customer" or a "consumer"). The environment also includes a computer system 114 of the merchant's acquirer, a computer system 118 of an issuing bank, a computer system 116 of a card payment network, and optionally, a computer system 108 of a payment service (hereinafter "payment service system 108"). Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a Wireless Fidelity (WiFi) network and/or a cellular telecommunications network).

Figure 2A:
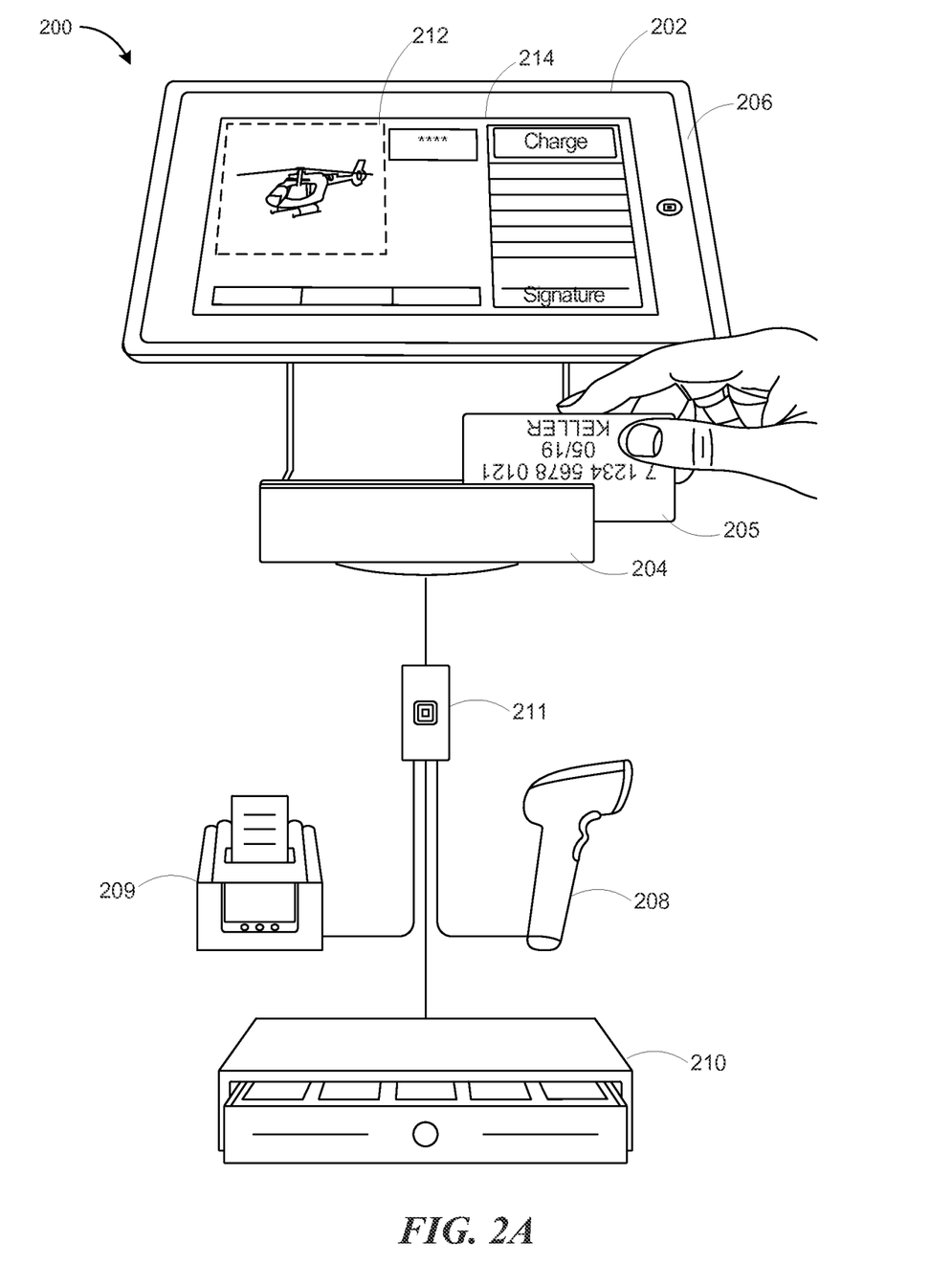
FIG. 2A illustrates a specific example of a scenario in which a point-of-sale (POS) system displays a decrypted image on its touchscreen.

The POS system 104 may be a general purpose computer, a specific computer designed for POS purposes, and/or a combination thereof (e.g., a tablet computer combined with a docking station designed for POS purposes, such as one illustrated in FIG. 2A), and may include a display screen for, among other functions, displaying information. The user's mobile device 102 can be, for example, a smart phone, tablet computer, notebook computer, or any other form of mobile processing device, all of which may have a display screen for displaying information. In some implementations of the optional embodiment, a mobile payment application 120 can run on the user's mobile device 102 to interact with other components in the environment; for example, in one embodiment, the mobile payment application 120 can receive a digital version of a transaction receipt from the merchant and/or can be utilized to view details of transactions and payment information. In some examples, the user's mobile device 102 can run a web browser 122 that can load websites (e.g., hosted by the merchant 100 or by the payment service system 108) within which transaction information and other payment details can be displayed online. Similarly, the merchant 100 can use his or her computing devices (not shown in FIG. 1 for simplicity) to log in to his or her account on webpages provided by a payment service system 108 for viewing various details of transactions.

In a typical credit card transaction, the merchant 100 swipes the user 101's credit card through a card reader at the merchant's POS system 104. The POS system 104 sends data read from the card (e.g., the cardholder's name, credit card number, expiration date and CVV) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104 via a path opposite of that described above.

All the aforementioned pieces of sensitive information can be displayed on the screens of various user devices (e.g., the POS system 104, or the mobile device 102) by use of encrypted/decrypted images and therefore are examples that are susceptible to attacks from malware. The technique introduced here, therefore, can be implemented in any of these devices to protect against such attacks.

FIG. 2A illustrates a more specific example of a scenario in which an electronic device displays a decrypted image on its touchscreen. A payment system 200, which is an embodiment of the POS system 104 of FIG. 1, includes an electronic device 202 that is illustrated in FIG. 2A as displaying an image, in which the disclosed technique may be applied. Note that the electronic device 202 of FIG. 2A, which is illustrated as being used in a point-of-sale (POS) setting, is used here as merely an example; other devices described in FIG. 1, such as the mobile device 102, may also encounter similar scenarios where a decrypted image is displayed for identity verification or other suitable purposes.

The electronic device 202 is a data processing device (e.g., which may be either general-purpose or application-specific). For example, the electronic device 202 may be a mobile phone, a tablet, an e-reader, other mobile or portable computing devices, or other stationary computing devices. The electronic device 202 may be configured to facilitate a financial transaction. The electronic device 202 may be coupled to a card reader 204, which can initiate a financial transaction to purchase items from a merchant operating the electronic device 202 upon detecting a swipe of a payment card 205.

In the illustrated embodiment, the card reader 204 is integral to a docking station 206 and is coupled to the electronic device 202 through the docking station 206. In other embodiments, however, the card reader 204 can be a separate component connected to the electronic device 202 or to the docking station 206. For example, in embodiments, the card reader 204 may be replaced by a dongle type attachment that plugs into an audio port or data connector port of the electronic device 202 and performs similar function of detecting swipe of the payment card 205 and transfers information to the electronic device want to. The electronic device 202 may fit into a cavity of the docking station 206 as shown.

The docking station 206 and/or the electronic device 202 are illustrated as being coupled to one or more peripheral components, such as a label reader 208, a receipt printer 209, or a cashier drawer 210. The peripheral components can be coupled to the electronic device 202 through a hub device 211, such as a wired hub or a wireless router. A user may purchase various items for checkout through one of the peripheral components, such as through the label reader 208 coupled to the electronic device 202, through a user's mobile device, or through a storefront interface on the electronic device 202. During checkout, the card reader 204 can read and/or access the payment card 205. The payment card 205 may be a credit card, a debit card, an EMV card, or another type of passive or active payment device. The payment card 205 may communicate, for example, via magnetism, radio frequency, near field communication (NFC), acoustic wave, optical modulation, or another method or methods of communication.

Figure 2B:
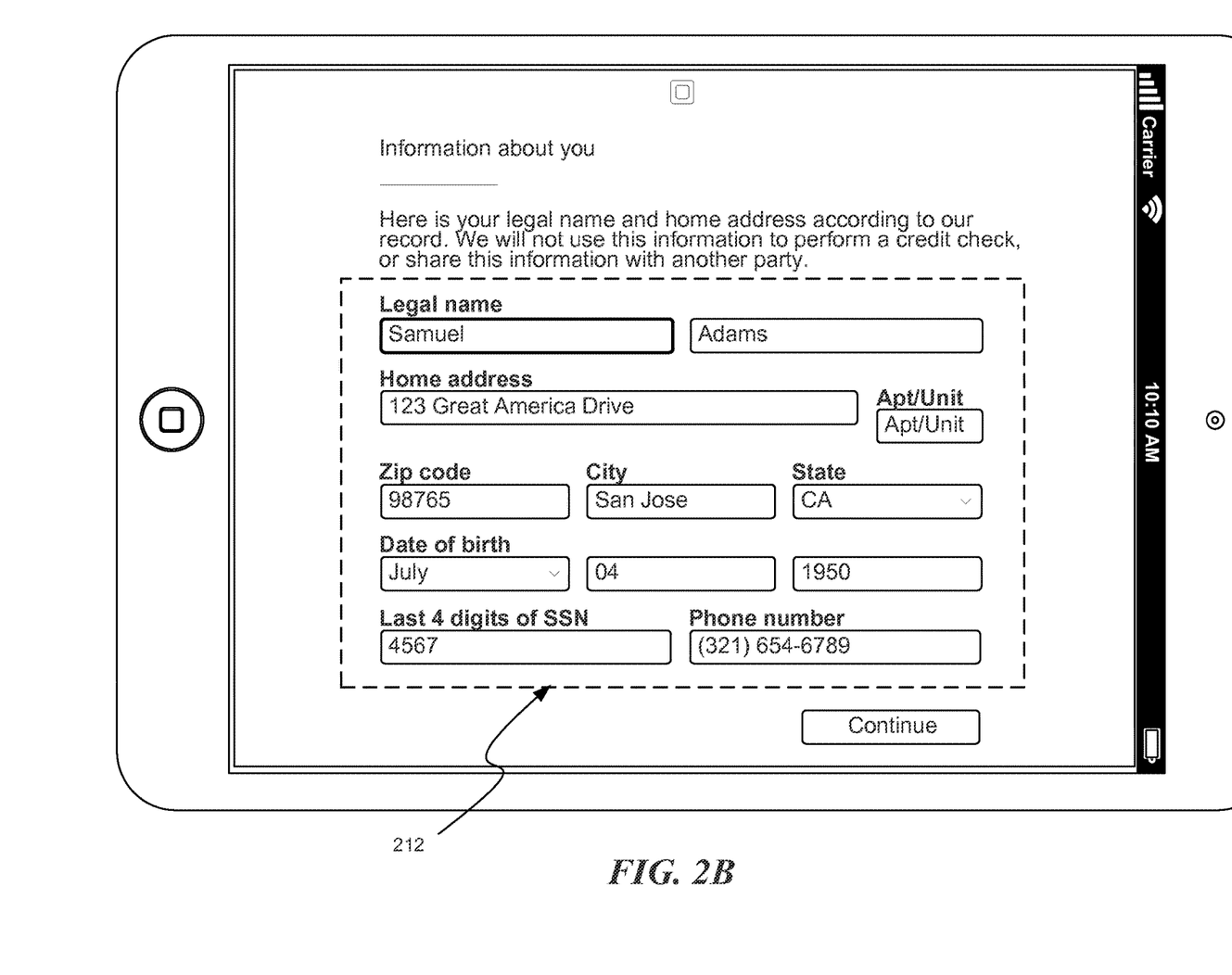
FIG. 2B illustrates the sensitive information included in the decrypted image of FIG. 2A.

Usage of the payment system 200 may involve displaying an image preselected by the merchant in order to verify that the electronic device 202 communicates with the correct server (i.e., for example, the payment service system 108 as opposed to a server controlled by a malicious party and pretending to be the payment service system 108). For example, the electronic device 202 can display, on a touchscreen 214 of the electronic device 202, an image 212 that is selected by the merchant, such as shown in FIG. 2A. Additionally or alternatively, usage of the payment system 200 may involve displaying sensitive information to a merchant (e.g., during a set up phase where bank account information can be adjusted) by use of one or more images. Such example is illustrated in FIG. 2B. Similar scenarios may occur to facilitate usage of other devices, for example, the user's mobile device 102.

When the payment service system 108 transmits the image 212 to the electronic device 202, the image 212 can be encrypted by, for example, the payment service 108 using a variety of cryptographic algorithms to protect the image 212 from getting stolen when traveling through the network 106. Note that, for simplicity, the discussion of embodiments herein assumes the usage of a symmetric cryptographic key scheme where the same cryptographic key is used for both encryption and decryption purposes; however, a person having ordinary skill in the art may choose other schemes in practicing the disclosed embodiments. For example, one can opt for an asymmetric key scheme where the cryptographic key for encryption and the cryptographic key for decryption are different. Therefore, when given a set of cryptographic keys where one subset of keys can decrypt items that are encrypted using another subset of keys, the two subsets of cryptographic keys are referred to herein as being "corresponding to each other." As mentioned earlier, however, if the malicious party is able to install a malware in the electronic device 202 itself, then the image 212 can still be subject to capture because the malware can capture the image 212 after the electronic device 202 decrypts the encrypted image.

Based on the technique introduced here, the electronic device 202 is able to load a cryptographic shader into its graphics processor that is separate from its central processor. An encrypted image is only decrypted inside the graphics processor by the cryptographic shader loaded in the graphics processor, and an decrypted image is displayed by the graphics processor directly from the graphics processor to display screen after decryption without passing through the central processor or the main memory. In this way, the electronic device 202 can prevent the decrypted images from being captured by a malicious software, whether the malicious software is installed locally on the electronic device 202 or remotely on another computing device.

Figure 3A:
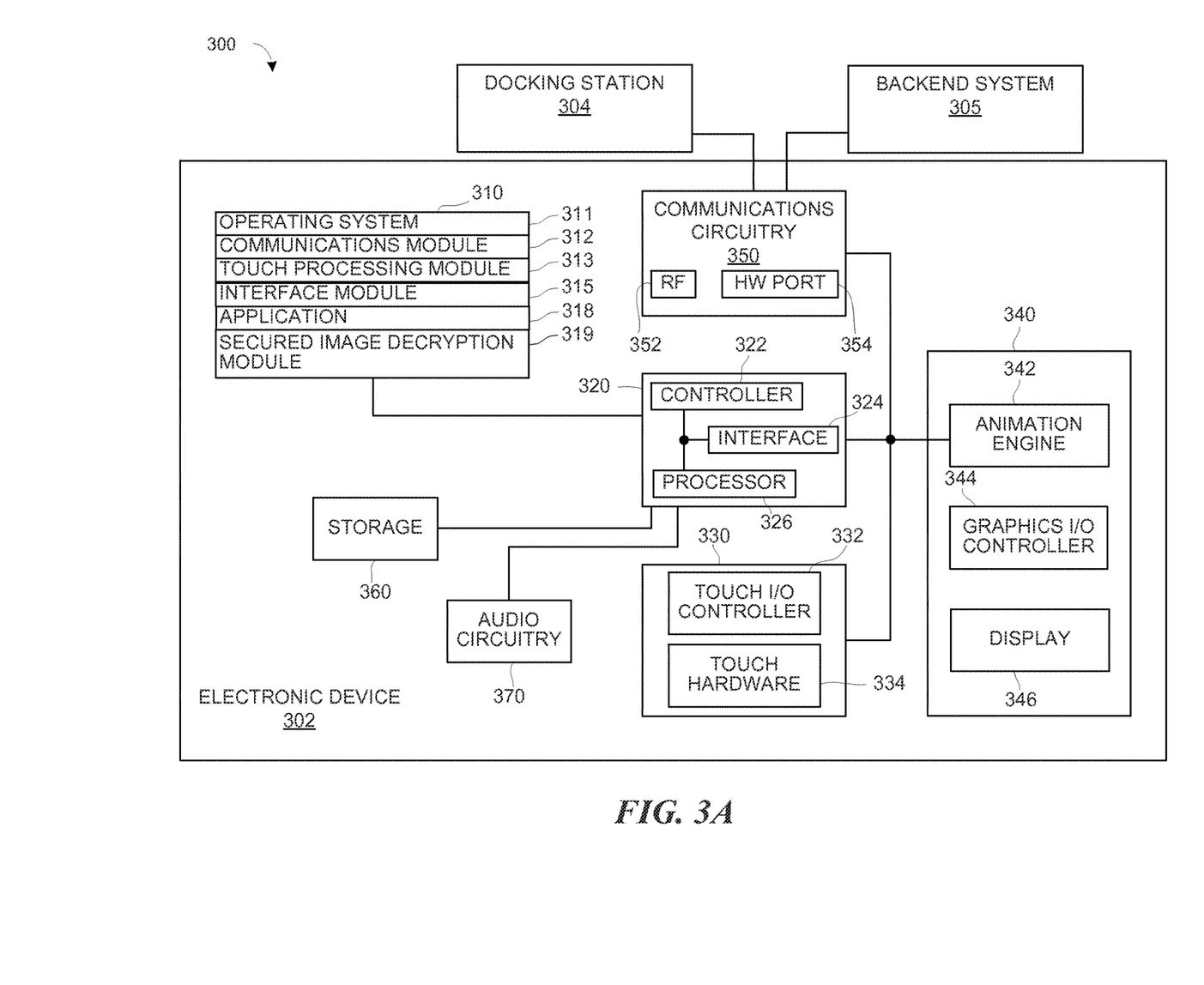
FIG. 3A is a block diagram of a POS system including an electronic device and a docking station, the electronic device including examples of components that are configured to implement some embodiments introduced here.

FIG. 3A illustrates a block diagram of a POS system 300 (e.g., the POS system 104 of FIG. 1, the payment system 200 of FIG. 2A, etc.) including an electronic device 302 (e.g., the electronic device 202 of FIG. 2A), a docking station 304 (e.g., the docking station 206 of FIG. 2A), and a backend system 305 (e.g., the payment service system 108 of FIG. 1). Note that the architecture shown in FIG. 3A is only one example of an architecture for a system which may be used for passcode entry in accordance with the technique introduced here; further, the electronic device 302 in FIG. 3A could have more or fewer components than shown, or a different configuration of components. The various components shown in FIG. 3A can be implemented by using hardware, software, firmware or a combination thereof, including one or more signal processing and/or application specific integrated circuits.

The electronic device 302 that can include one or more computer-readable mediums 310, processing system 320, touch subsystem 330, display/graphics subsystem 340, communications circuitry 350, storage 360, and audio circuitry 370. These components may be coupled by one or more communication buses or other signal lines. The electronic device 302 can be the same as or similar to the electronic device 102 or the electronic device 202.

The communications circuitry 350 can include RF circuitry 352 and/or port 354 for sending and receiving information. The RF circuitry 352 permits transmission of information over a wireless link or network to one or more other devices and includes well-known circuitry for performing this function. The port 354 permits transmission of information over a wired link. The communications circuitry 350 can communicate, for example, with the docking station 304 or the backend system 305 for verifying the passcode entry. The communications circuitry 350 can be coupled to the processing system 320 via a peripherals interface 324. The peripherals interface 324 can include various known components for establishing and maintaining communication between peripherals and the processing system 320.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

The audio circuitry 370 can be coupled to an audio speaker (not shown), a microphone (not shown), an electronic card reader (not shown), or any combination thereof and includes known circuitry for processing voice signals received from the peripherals interface 324 to enable a user to communicate in real-time with other users. In some embodiments, the audio circuitry 370 includes a headphone jack (not shown).

The peripherals interface 324 can couple various peripherals, such as an electronic card reader, of the system to one or more processors 326 and the computer-readable medium 310. The one or more processors 326 can communicate with one or more computer-readable mediums 310 via a controller 322. The computer-readable medium 310 can be any device or medium that can store code and/or data for use by the one or more processors 326. The medium 310 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 310 may also include a transmission medium for carrying information-bearing signals indicative of computer instructions or data (with or without a carrier wave upon which the signals are modulated). For example, the transmission medium may include a communications network, including but not limited to the Internet, intranet(s), Local Area Networks (LANs), Wide Local Area Networks (WLANs), Storage Area Networks (SANs), Metropolitan Area Networks (MAN) and the like.

The touch I/O controller 332 is coupled to the touch hardware 334 for controlling or performing various functions. The touch hardware 332 communicates with the processing system 320 via the touch I/O device controller 332, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, the touch hardware 334 displays visual output to the user in a GUI. The visual output may include text, graphics, video, and any combination thereof. Some or all of the visual output may correspond to user-interface objects. The touch hardware 334 forms a touch-sensitive surface that accepts touch input from the user. The touch hardware 334 and the touch controller 332 (along with any associated modules and/or sets of instructions in the medium 310) detects and tracks touches or near touches (and any movement or release of the touch) on the touch hardware 334 and converts the detected touch input into interaction with graphical objects, such as one or more user-interface objects. In the case in which the touch hardware 334 and the display 325 are embodied as a touch screen, the user can directly interact with graphical objects that are displayed on the touch screen. Alternatively, in the case in which hardware 334 is embodied as a touch device other than a touch screen (e.g., a touch pad), the user may indirectly interact with graphical objects that are displayed on a separate display screen. Embodiments in which the touch hardware 334 is a touch screen, the touch screen may use LCD (liquid crystal display) technology, LPD (light emitting polymer display) technology, OLED (organic light emitting diode), or OEL (organic electro luminescence), although other display technologies may be used in other embodiments.

In some embodiments, the peripherals interface 324, the one or more processors 326, and the memory controller 322 may be implemented on a single chip. In some other embodiments, they may be implemented on separate chips. The storage 360 can any suitable medium for storing data, including, for example, volatile memory (e.g., cache, RAM), non-volatile memory (e.g., Flash, hard-disk drive), or a both for storing data, including pages used for transition animations.

The one or more processors 326 can run various software components stored in the medium 310 to perform various functions for the electronic device 302. Note that the order of the modules in the medium 310 does not necessarily denote the order of layers of a software stack as implemented in the medium 310. In some embodiments, the software components include an operating system 311, a communication module (or set of instructions) 312, a touch processing module (or set of instructions) 312, an interface module (or set of instructions) 315, which can include a secured image decryption module 319, and one or more applications (or set of instructions) 318. The secured image decryption module 319 is illustrated in FIG. 3 as a separate module in accordance with some embodiments, although it can be combined with one or more other modules 311-318 mentioned here. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. In some embodiments, the medium 310 may store a subset of the modules and data structures identified above. Furthermore, the medium 310 may store additional modules and data structures not described above.

The operating system 311 can include various procedures, sets of instructions, software components and/or drivers for controlling and managing general system tasks (e.g., memory management, storage device control, power management, etc.) and facilitates communication between various hardware and software components.

The communication module 312 facilitates communication with other devices using the communications circuitry 350 and includes various software components for handling data received from the RF circuitry 352 and/or the port 354.

The touch processing module 313 includes various software components for performing various tasks associated with touch hardware 334 including but not limited to receiving and processing touch input received from the I/O device 330 via a touch I/O device controller 332. For example, the touch processing module 313 can also include software components for performing tasks associated with other I/O devices (not shown).

One or more applications 318 can include any applications installed on the electronic device 302, including without limitation, modules of the electronic device 200, a browser, keyboard emulation, widgets, JAVA-enabled applications, encryption, digital rights management, voice recognition, voice replication, location determination capability (such as that provided by the global positioning system (GPS)), etc. One example of the applications 318 is the mobile payment application 120 of FIG. 1.

The interface module 315 can provide animation instructions to an animation engine 342, which can render the graphics and provide the rendering to graphics I/O controller 344, so that the graphics I/O controller 344 can display the graphics on display 346. The interface module 315 can further control the audio circuitry 370 to provide an auditory component to the passcode interface. The interface module 315 can include various known software components for rendering, animating and displaying graphical objects on a display surface.

The secured image decryption module 319 may be a software function library accessible through an application programming interface (API) or a standalone functioning software module inside the POS 300. In variations, the secured image decryption module 319 may be integrated with a POS software application (e.g., if implemented on the POS system 300 or with the mobile payment application 120 (e.g., if implemented on the mobile device 102). In more details described below, the secured image decryption module 319 is configured to cause the graphics/display subsystem 340 to decrypt, by use of a cryptographic shader, encrypted images within the graphics/display subsystem 340. The graphics/display subsystem 340 is structured in ways that, when the images are decrypted by the cryptographic shader loaded in the subsystem 340, the decrypted images are displayed directly from the graphics system to the display 346.

Figure 3B:
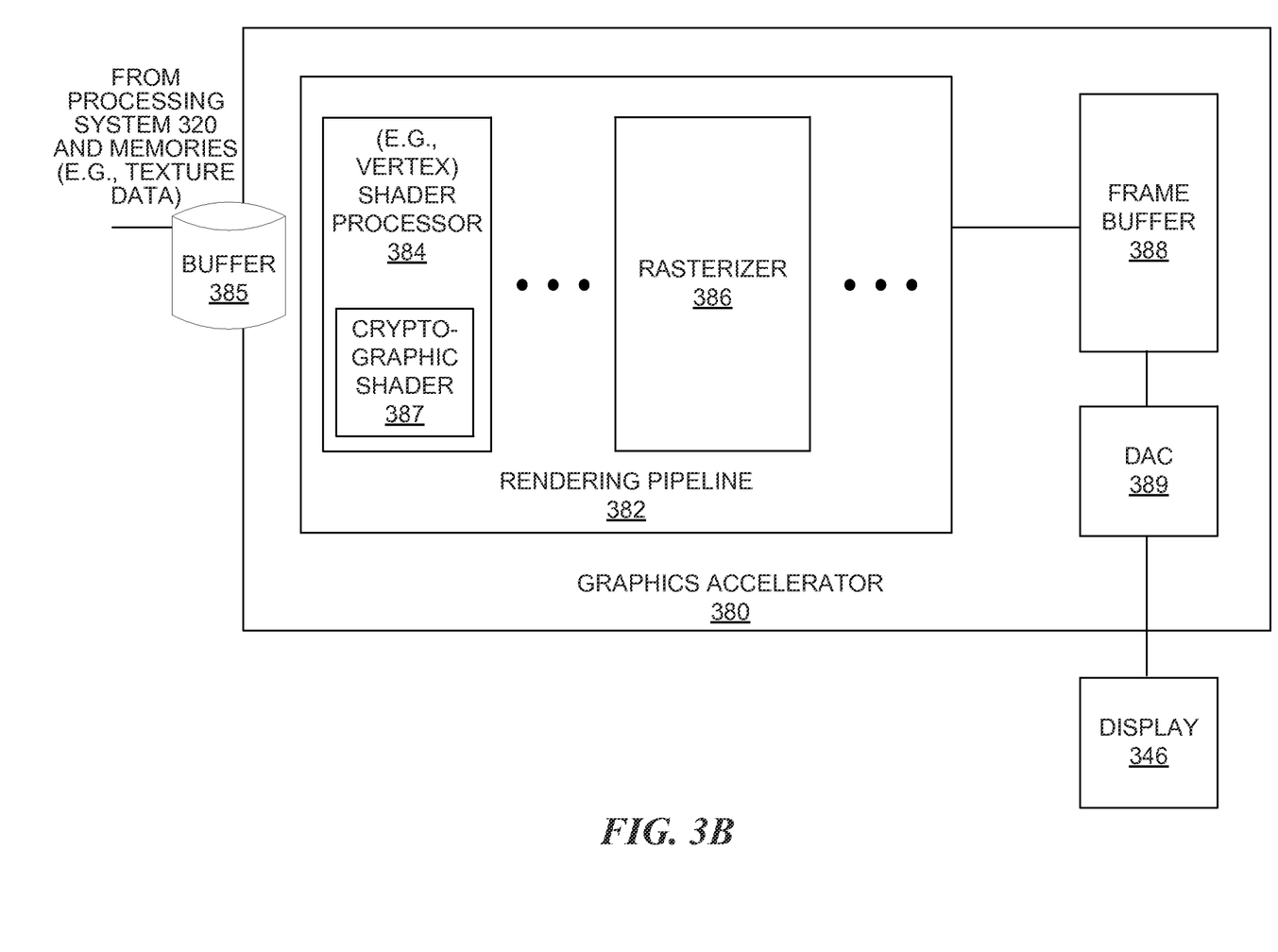
FIG. 3B is a block diagram of an example of a graphics accelerator in the electronic device of FIG. 3A, the graphics accelerator including examples of components that are configured to implement some embodiments disclosed herein.

FIG. 3B illustrates a block diagram of an example of a graphics accelerator 380, which is an embodiment of the animation engine 342 and the graphics I/O controller 344 of FIG. 3A. As illustrated, the graphics accelerator 380 includes exemplary components that are configured to implement some aspects of the technique introduced here. The graphics accelerator 380 is also generally referred to herein as a graphics processing unit (GPU). Note that, in some embodiments of the electronic device 302, a standalone hardware module (not shown for simplicity) can be included in device 302 in addition to the graphics accelerator 380, such that the standalone hardware module can practice one or more aspects of the introduced technique in the same or similar manner as the graphics accelerator 380.

The graphics accelerator 380 includes a rendering pipeline 382, which typically includes a vertex shader 384 (which can be coupled to or be in the form of a vertex processor (not shown)), a rasterizer 386, and a frame buffer 388. An input buffer 385, shown in FIG. 3B, is coupled to the rendering pipeline 382 to temporarily store input data (e.g., vertex commands, texture data, encrypted images, etc.) from the processing system 320 and from memories that are not within the graphics subsystem 340, such as the main memory and storage space in the hard disk drive. The graphics accelerator 380 may also include other known components such as texture mapping hardware, sub-processors (e.g., a fragment processor), additional buffers or registers, and/or other I/O controller; these components are not shown for simplicity. The components shown in FIG. 3B are communicatively coupled to each other, which may be directly or indirectly connected to each other through one or more interconnects or wires.

In some implementations, the vertex shader 384 receives vertex data from the host CPU that defines the primitives that make up the view to be displayed. The geometry accelerator typically includes various components for graphics rendering, such as a clipping component, an illumination component, and a plane equations component. The transform component can perform transformations on the vertex data received by the rendering pipeline 382 (e.g., from the CPU, such as rotation and translation of the image space defined by vertex data). Next, the clipping component can reduce the amount of necessary calculation by clipping the vertex data so that only vertex data relating to primitives that make up the portion of the view that will be seen by the user is kept for further processing. The illumination or lighting component then calculates the final colors of the vertices of the primitives based on the vertex data and based on lighting conditions. The plane equations component generates floating point equations which define the image space within the vertices. The floating point equations are later converted into fixed point equations before being rasterized.

Thereafter, the rasterizer 386 and the texture mapping hardware (not shown) generate the final screen coordinates and color data for each pixel in each primitive. The pixel data is stored in the frame buffer 388 for display, after being converted from digital form into analog form by a digital-to-analog (DAC) converter 389 for example, on a video display screen 346. In variations, the DAC 389 is not necessary, and the pixel data is transferred from the frame buffer digitally to the display 346. In this sense, various components (e.g., the vertex shader 384 and the rasterizer 386) in the rendering pipeline 382 can generate, based on the instruction(s) received from the processing system 320, a plurality of images to be displayed on the display 346.

Notably, FIG. 3B is an abstract, simplified diagram in which some of the illustrated components may include subcomponents. For example, the vertex shader 384 may be implemented as a multi-core shader processor having a plurality of shader cores. It is not uncommon to see hundreds of specialized cores with highly parallel structures in modern GPU designs. Further, according to some of the present embodiments, the vertex shader 384 is a programmable shader processor(s) that can be programmed (e.g., by loading one or more "shaders" into the shader processor) to perform a variety of shading tasks (in addition or as an alternative to the vertex shading introduced above). For simplicity, the discussion here points to the vertex shader 384 as a general representative of any suitable programmable processing unit (or units) that is physically and logically separate from the CPU and with the capability of loading a shader program for image processing (e.g., a cryptographic shader 387 that implements a cryptographic algorithm for decrypting encrypted images). Such physically and logically separate processing unit supplementing or enhancing the functions of the primary processor (i.e., the CPU) may be referred to herein as a "coprocessor" unit. Consequently, the cryptographic shader 387 is not limited to be loaded in a "vertex shader;" for example, a person having ordinary skill in the art will be able to modify the techniques disclosed here to load the cryptographic shader 387 in a texture shader(s) (not shown for simplicity), in another suitable shader processing core, or in a hardware module that is dedicated to perform the techniques introduced here. Note, however, that the GPU is generally preferred over a standalone hardware module because typically it is the GPU that has direct access to the display 346 (e.g., via the frame buffer 388).

According to some aspects of the technique introduced here, before the encrypted images get decrypted (for example, during a set up phase), the secured image decryption module 319 can first cause the CPU (e.g., the processing system 320) to load the cryptographic shader 387 into the GPU (e.g., the graphics/display system 340) in the electronic device 302. The cryptographic shader 387 includes instructions that implement a cryptographic algorithm that is configured to decrypt encrypted images. In some implementation, the cryptographic algorithm is a white-box cryptographic algorithm within which a cryptographic key is integrated so that the cryptographic key is protected from extraction. One specific example of the cryptographic algorithm is a white-box implementation of the Advanced Encryption Standard (AES). As mentioned, a white-box cryptography implementation is preferred (even though not required) because it allows one to perform cryptographic operations without revealing any portion of confidential information such as the cryptographic key.

Then (for example, during normal operation), when an encrypted image is to be decrypted, the secured image decryption module 319 can cause the CPU to load the encrypted image (e.g., from the main memory) to an input of the GPU (e.g., the input buffer 385) for decryption. According to one or more embodiments, the decrypted image, after being decrypted by the cryptographic shader 387, is neither stored back to the input buffer 385 nor the main memory.

More specifically, in some implementations, the encrypted image is received externally from a remote server (e.g., the payment service system 108) via the network 106. In some other implementations, the encrypted image can be received internally (e.g., from another application 318 via an API provided by the secured image decryption module 319). The encrypted image can be, for example, encrypted by the remote server using the same cryptographic algorithm and the same cryptographic key as the white-box implementation of the cryptographic algorithm in the cryptographic shader 387.

After receiving the encrypted image, the secured image decryption module 319 can cause the CPU in the electronic device 302 to transfer (e.g., copy, move, and the like) the encrypted image from where the encrypted image is stored (e.g., a main memory or a buffer of the communications circuitry 350) to the GPU (e.g., to the input buffer 385). At the GPU, the cryptographic shader 387 reads from the input buffer 385 the encrypted image, and generates image data that represents a decrypted image. Thereafter, the decrypted image is loaded directly from the GPU into the frame buffer 388 that is coupled to the GPU. In this way, the decrypted image is to be displayed by the display 346 (e.g., through the DAC 389) of the electronic device 302 for the user to perceive without any portion of the decrypted image passing through the CPU nor the main memory. With the introduced embodiments, the cryptographic shader technique can be implemented on the GPU to protect (by decrypting within the GPU) images with sensitive information sent from the server. Because the encrypted image is downloaded from the server through the secured image decryption module 319 (e.g., which may be embodied in a POS application operating on the POS system 104 or in the mobile payment application 120 operating on the mobile device 102) as encrypted, and remains encrypted in the secured image decryption module 319 until the encrypted image is loaded onto the GPU, decrypted by the cryptographic shader 387, and directly rendered onto the display 346, the encrypted image is not stored in the medium 310 at any given moment, therefore not susceptible for interception by malicious software. In this way, malware (e.g., residing in the operating system 311) is not able to capture the image in transit because the image remains encrypted all the way until it gets decrypted inside the graphics/display subsystem 340 (e.g., the GPU, or the graphics accelerator 380) and directly displayed for viewing—that is, without passing through the processing system 320 (e.g., the CPU), the computer readable medium 310 (e.g., main memory), or the storage 360 (e.g., hard disk drive).

In addition, some embodiments of the secured image decryption module 319 can receive a signal that signifies a change in at least one of the cryptographic algorithm or the cryptographic key, that is, a change in the cryptographic algorithm and key combination. An example source of such signal can be from a remote server, for instance, the payment service system 108. In response to the signal, the secured image decryption module 319 can load, based on the signal, a new cryptographic shader into the GPU (into one or more processing cores of the shader 384). The new cryptographic shader includes either a different cryptographic algorithm or a different cryptographic key or both. In the instances where the cryptographic shader 387 implements white-box cryptography, the new cryptographic shader includes instructions that implement a different white-box cryptographic algorithm.

In variation, after the secured image decryption module 319 receives a change signal (e.g., from the remote server), the secured image decryption module 319 can cause either the CPU or the GPU to locate, based on the change signal, the cryptographic shader 387 from a plurality of available cryptographic shaders. In one example where the plurality of available cryptographic shaders are stored in the medium 310 or the storage 360, the CPU can be used to locate the cryptographic shader 387 from a plurality of available cryptographic shaders. In another example where the plurality of available cryptographic shaders are stored inside the GPU (e.g., in a memory coupled to the GPU, not shown for simplicity), the GPU can be used to locate, based on the change signal, the cryptographic shader 387 from a plurality of available cryptographic shaders. In some embodiments, the plurality of available cryptographic shaders can be from the remote server, for example, via a secured network protocol. Specifically, in some embodiments, after the change signal is received (e.g., from the remote server), either the CPU or the GPU can calculate a hash value based on a hash function using the received signal. The hash value can represent which cryptographic shader, out of a plurality of available cryptographic shaders (e.g., stored in the main memory or inside the GPU), is to be loaded into the GPU in order to correctly decrypt the encrypted image.

With the disclosed embodiments, the likelihood of an unscrupulous party being able to intercept the decrypted image with a malware that operates on the electronic device 302 is decreased, because the decrypted image data is only decrypted on the GPU and then rendered directly to the screen. The technique introduced here reduces the vulnerability to malware's eavesdropping or impersonation because the only place where the decrypted image exists is on the GPU and not the application processor (i.e., the CPU).

Note that the cryptographic shader technique discussed here may be implemented with additional security techniques in order to further enhance data security, for example, to protect against the possibility that decrypted data be extracted directly from the frame buffer 388 or from the display 346. For example, the cryptographic shader technique may be used in conjunction with a secure display element technique, in which the sensitive information is broken down and distributed over time in ways that make it hard or even impossible for an unscrupulous party to decode it by sampling just a few screenshots. Details of such secure display element technique are described in a concurrently filed U.S. patent application Ser. No. 14/527,629, entitled "SECURE DISPLAY ELEMENT," portions of which relate to one or more aspects of the secure display element technique (e.g., FIGS. 4A through 11 and their accompanying text) are incorporated herein by reference.

Figure 4:
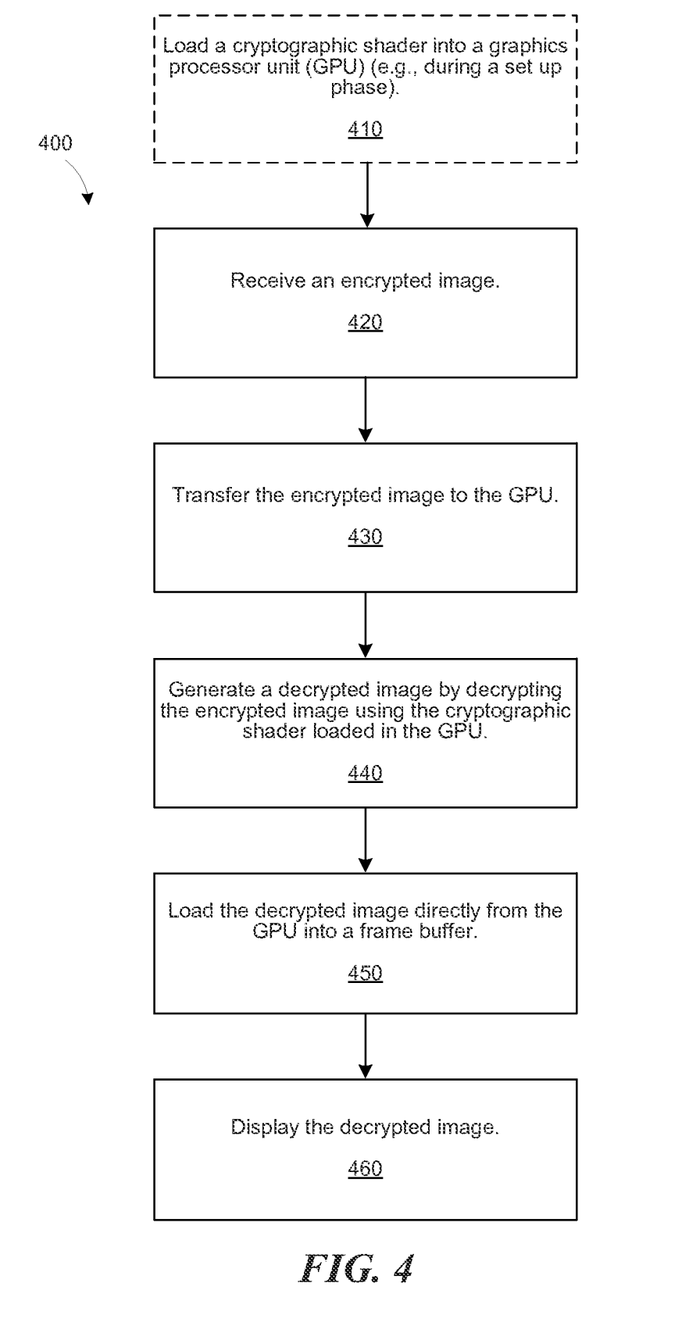
FIG. 4 is a flow diagram illustrating an example of a process for securely displaying an image on an electronic device.

FIG. 4 is a flow diagram illustrating an example of a process 400 for securely displaying an image on an electronic device. The process 400 can be performed by, for example, the secured image decryption module 319 in conjunction with the processing system 320 and the display/graphics subsystem 340 in decrypting encrypted images solely in the display/graphics subsystem 340, where the decrypted data is directly displayed without passing through or flowing back to the processing system 320. To facilitate description, the process 400 is explained below with reference to FIGS. 3A-3B.

Before the encrypted images get decrypted (for example, during a set up phase), the secured image decryption module 319 can first cause the CPU (e.g., the processing system 320) to load (410) the cryptographic shader 387 into the GPU (e.g., the graphics/display system 340) in the electronic device 302. The cryptographic shader 387 includes instructions that implement a cryptographic algorithm that is configured to decrypt encrypted images. The cryptographic algorithm can be a white-box cryptographic algorithm within which a cryptographic key is integrated so that the cryptographic key is protected from extraction. One specific example of the cryptographic algorithm is a white-box implementation of the Advanced Encryption Standard (AES).

Then (for example, during normal operation), in some implementations, the encrypted image is received (420) externally from a remote server (e.g., the payment service system 108) via the network 106. In some other implementations, the encrypted image can be received (420) internally (e.g., from another application 318 via an API provided by the secured image decryption module 319). The encrypted image can be, for example, encrypted by the remote server using the same cryptographic algorithm and the same cryptographic key as the white-box implementation of the cryptographic algorithm in the cryptographic shader 387.

Next, After receiving the encrypted image, the secured image decryption module 319 can cause the CPU in the electronic device 302 to transfer (e.g., copy, move, and the like) (430) the encrypted image from where the encrypted image is stored (e.g., a main memory or a buffer of the communications circuitry 350) to the GPU (e.g., to the input buffer 385).

At the GPU, the cryptographic shader 387 reads from the input buffer 385 the encrypted image, and generates (440) image data that represents a decrypted image. Thereafter, the decrypted image is loaded (450) directly from the GPU into the frame buffer 388 that is coupled to the GPU. In this way, the decrypted image is displayed (460) by the display 346 (e.g., through the DAC 389) of the electronic device 302, from the decrypted image data in the frame buffer, for the user to perceive without any portion of the decrypted image having passed through the CPU nor the main memory. Note that one or more steps introduced here may be performed out of order. For example, step 410 (loading the cryptographic shader) may be performed after Step 420 (receiving the encrypted image) or step 430 (transferring the encrypted image).

Figure 5:
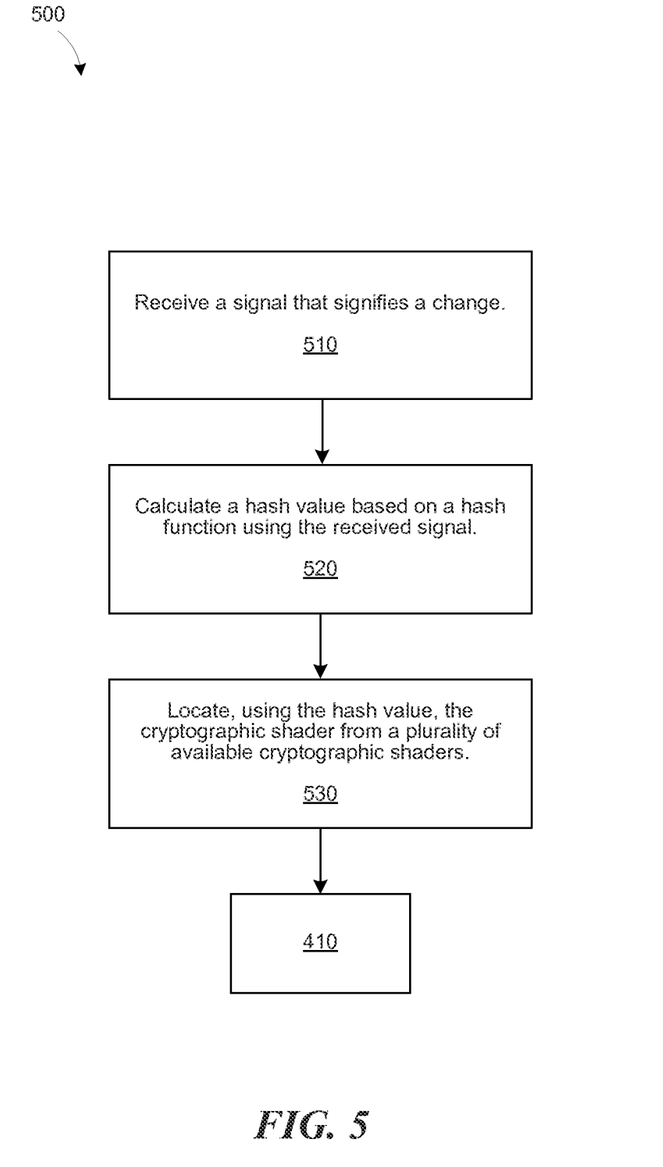
FIG. 5 is a flow diagram illustrating additional details of the process of FIG. 4.

FIG. 5 is a flow diagram 500 illustrating additional details of the process 400 of FIG. 4. In addition to what are introduced above with respect to the process 400, some embodiments of the secured image decryption module 319 can receive (510) a signal that signifies a change in at least one of the cryptographic algorithm or the cryptographic key, that is, a change in the cryptographic algorithm and key combination. An example source of such signal can be from the remote server, for instance, the payment service system 108. In response to the signal, the secured image decryption module 319 can load, based on the signal, a new cryptographic shader into the GPU (into one or more processing cores of the shader 384).

To do so, depending on the embodiment (in which the location of the plurality of available cryptographic shaders are stored may differ), after the change signal is received (e.g., from the remote server), either the CPU or the GPU can calculate (520) a hash value based on a hash function using the received signal. The hash value can represent which cryptographic shader, out of a plurality of available cryptographic shaders (e.g., stored in the main memory or inside the GPU), is to be loaded into (e.g., the vertex shader 384 of) the GPU in order to correctly decrypt the encrypted image.

Then, the secured image decryption module 319 can cause the CPU to locate (530), based on the change signal, the cryptographic shader 387 from a plurality of available cryptographic shaders, for example, in the case that the plurality of available cryptographic shaders are stored in the medium 310 or the storage 360. Alternatively, the secured image decryption module 319 can cause the GPU to locate (530), based on the change signal, the cryptographic shader from a plurality of available cryptographic shaders, for example, in the case that the plurality of available cryptographic shaders are stored inside the GPU (e.g., in a memory coupled to the GPU, not shown for simplicity).

Figure 6:
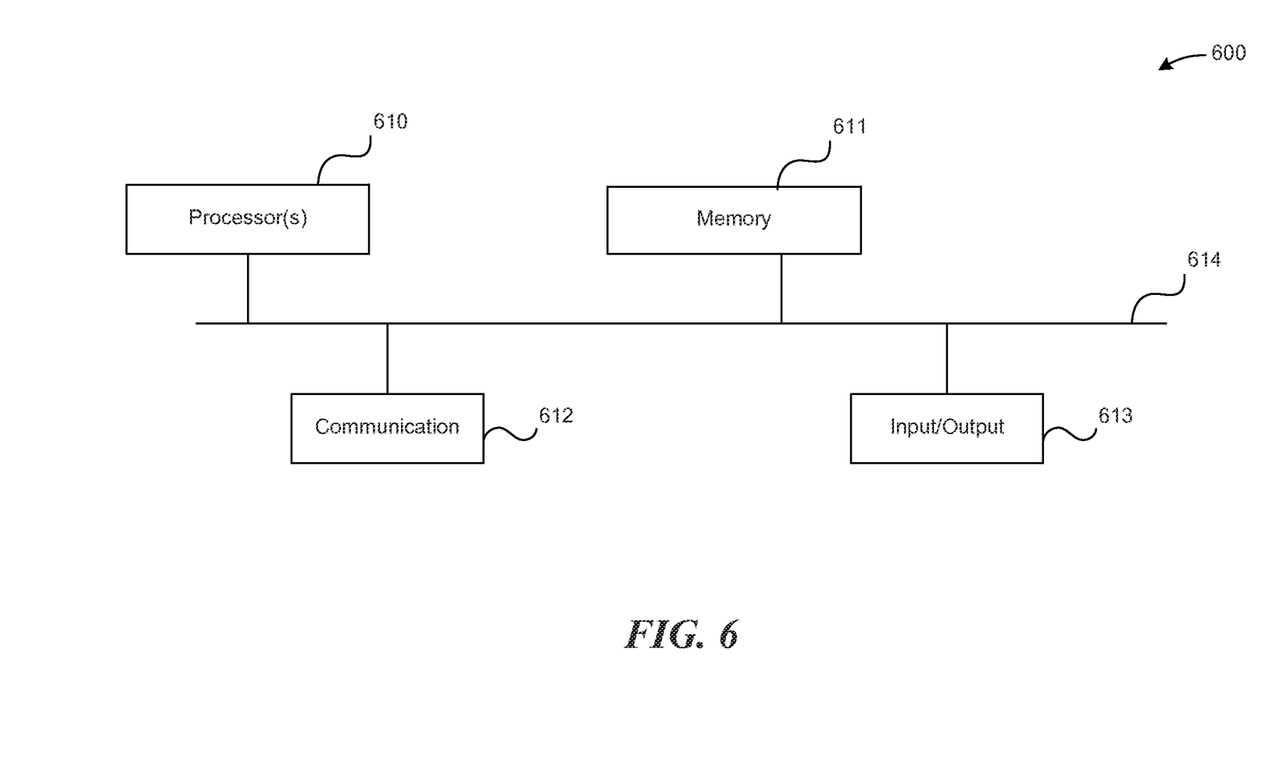
FIG. 6 is a high-level block diagram showing an example of a computing system in which at least some operations related to the techniques introduced here can be implemented.

FIG. 6 is a high-level block diagram showing an example of a processing device 600 that can represent any of the devices described above, such as the mobile device 102, the merchant POS system 104, payment service system 108, acquirer system 114, card payment network 116, issuer system 118, or electronic devices 202, 302. As noted above, any of these systems may include two or more processing devices such as represented in FIG. 6, which may be coupled to each other via a network or multiple networks.

In the illustrated embodiment, the processing system 600 includes one or more processors 610, memory 611, a communication device 612, and one or more input/output (I/O) devices 613, all coupled to each other through an interconnect 614. The interconnect 614 may be or include one or more conductive traces, buses, point-to-point connections, controllers, adapters and/or other conventional connection devices. The processor(s) 610 may be or include, for example, one or more general-purpose programmable microprocessors, microcontrollers, application specific integrated circuits (ASICs), programmable gate arrays, or the like, or a combination of such devices. The processor(s) 610 control the overall operation of the processing device 600. Memory 611 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 611 may store data and instructions that configure the processor(s) 610 to execute operations in accordance with the techniques described above. The communication device 612 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 613 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium can include recordable/non-recordable media (e.g., read-only memory (ROM), random access memory (RAM), magnetic disk storage media, optical storage media, flash memory devices, etc.).

Note that any and all of the embodiments described above can be combined with each other, except to the extent that it may be stated otherwise above or to the extent that any such embodiments might be mutually exclusive in function and/or structure.

Although the present disclosure has been described with reference to specific exemplary embodiments, it will be recognized that the invention is not limited to the embodiments described. Accordingly, the specification and drawings are to be regarded in an illustrative sense rather than a restrictive sense.

What is claimed is:

1. A method in a mobile computing device for protecting sensitive information that is to be displayed by the mobile computing device, the method comprising:
    loading a cryptographic shader into a graphics processor unit (GPU) in the mobile computing device separate from a central processing unit (CPU) in the mobile computing device, wherein the cryptographic shader includes shading instructions that implement at least a portion of a white-box cryptographic algorithm, wherein a cryptographic key is integrated within the white-box cryptographic algorithm so that the cryptographic key is protected from extraction, and wherein the white-box cryptographic algorithm is configured to decrypt encrypted images;
    receiving, at the mobile computing device, the sensitive information in the form of an encrypted image from a remote server via a wireless communication network, wherein the encrypted image has been encrypted by the remote server with the cryptographic key;
    transferring, by the CPU in the mobile computing device, the encrypted image from a main memory in the mobile computing device to the GPU;
    generating, by the GPU, a decrypted image by decrypting the encrypted image using the cryptographic shader loaded in the GPU; and
    loading the decrypted image directly from the GPU into a frame buffer that is coupled to the GPU and associated with a display device of the mobile computing device, for display by the display device, without any portion of the decrypted image passing through the CPU or the main memory.

2. The method of claim 1, further comprising:
    receiving a signal, from the remote server, that signifies a change in at least one of the cryptographic algorithm or the cryptographic key; and
    loading, in response to and based on the signal, a new cryptographic shader into the GPU in the mobile computing device, wherein the new cryptographic shader includes instructions that implement a different white-box cryptographic algorithm.

3. The method of claim 1, further comprising:
    receiving a signal from the remote server; and
    calculating a hash value based on a hash function using the received signal, wherein the hash value represents which cryptographic shader, out of a plurality of available cryptographic shaders stored in the main memory, is to be loaded into the GPU in order to correctly decrypt the encrypted image.

4. The method of claim 1, wherein said transferring comprises:
    the CPU loading the encrypted image from the main memory to an input buffer coupled to the GPU, wherein the decrypted image, after being decrypted by the cryptographic shader, is neither stored back to the input buffer nor the main memory.

5. The method of claim 1, further comprising:
receiving the cryptographic shader from the remote server via a secured network communications protocol.

6. A method for protecting information to be displayed on a computing device, the method comprising:
loading a cryptographic shader into a coprocessor unit in the computing device separate from a central processing unit (CPU) in the computing device, wherein the cryptographic shader includes shading instructions that implement at least a portion of a cryptographic algorithm configured to decrypt encrypted images;
decrypting, by the cryptographic shader loaded in the coprocessor unit, an encrypted image to produce decrypted image data; and
loading the decrypted image data directly from the coprocessor unit into a frame buffer that is coupled to the coprocessor unit and associated with a display of the computing device such that the decrypted image data does not pass through the CPU.

7. The method of claim 6, wherein the cryptographic algorithm is a white-box cryptographic algorithm within which a cryptographic key is integrated.

8. The method of claim 6, further comprising:
prior to said decrypting, receiving the encrypted image from a remote server via a network, wherein the encrypted image has been encrypted by the remote server with an encryption key that corresponds to a cryptographic key integrated in the cryptographic algorithm.

9. The method of claim 6, further comprising:
receiving a signal that signifies a change in at least one of the cryptographic algorithm or a cryptographic key integrated in the cryptographic algorithm; and
loading, based on the signal, a new cryptographic shader into the coprocessor unit in the computing device, wherein the new cryptographic shader includes at least one of a different cryptographic algorithm or a different cryptographic key.

10. The method of claim 6, further comprising:
receiving a signal; and
locating, based on the received signal, the cryptographic shader from a plurality of available cryptographic shaders.

11. The method of claim 10, further comprising:
receiving the plurality of available cryptographic shaders from a remote server.

12. The method of claim 6, further comprising:
loading, by the CPU, the encrypted image from a main memory of the computing device to an input buffer coupled to the coprocessor unit in the computing device without storing the decrypted image data back to the input buffer or the main memory after decryption by the cryptographic shader.

13. The method of claim 6, further comprising:
receiving the cryptographic shader from a remote server.

14. A computing device comprising:
a communication device to receive an encrypted image from a remote device;
a display;
a central processor unit (CPU); and
a graphics processor unit (GPU) separate from the CPU,
wherein the CPU is configured to load a cryptographic shader into the GPU,
wherein the cryptographic shader includes shading instructions that implement at least a portion of a cryptographic algorithm that is configured to decrypt encrypted images,
wherein the GPU is configured to decrypt, by the cryptographic shader loaded in the GPU, the encrypted image to produce a decrypted image, and
wherein the GPU is further configured to load image data decrypted from the encrypted image directly from the GPU into a frame buffer that is coupled to the GPU, such that the decrypted image is subsequently displayed by the display without the decrypted image data having passed through the CPU.

15. The device of claim 14, wherein the cryptographic algorithm is a white-box cryptographic algorithm within which a cryptographic key is integrated.

16. The device of claim 14, further comprising:
communications circuitry configured to receive the encrypted image from a remote server via a network, wherein the encrypted image is encrypted by the remote server with an encryption key that corresponds to the cryptographic key integrated in the cryptographic algorithm.

17. The device of claim 14, wherein the CPU or the GPU is further configured to:
in response to receiving a signal that signifies a change in at least one of the cryptographic algorithm or a cryptographic key integrated in the cryptographic algorithm, load, based on the signal, a new cryptographic shader into the GPU,
wherein the new cryptographic shader includes either a different cryptographic algorithm or a different cryptographic key or both.

18. The device of claim 14, wherein the CPU or the GPU is further configured to:
In response to receiving a signal, locate, based on the received signal, the cryptographic shader from a plurality of available cryptographic shaders.

19. The device of claim 18, further comprising:
communications circuitry configured to receive the plurality of available cryptographic shaders from a remote server.

20. The device of claim 14, wherein the CPU is further configured to:
load the encrypted image from a main memory to an input buffer coupled to the GPU,
wherein the decrypted image data, after being decrypted by the cryptographic shader, is neither stored back to the input buffer nor the main memory.

* * * * *